United States Patent [19]
Parruck et al.

[11] Patent Number: 5,142,529
[45] Date of Patent: Aug. 25, 1992

[54] METHOD AND MEANS FOR TRANSFERRING A DATA PAYLOAD FROM A FIRST SONET SIGNAL TO A SONET SIGNAL OF DIFFERENT FREQUENCY

[75] Inventors: Bidyut Parruck, Stratford; Daniel C. Upp, Southbury, both of Conn.

[73] Assignee: TranSwitch Corporation, Shelton, Conn.

[21] Appl. No.: 559,636

[22] Filed: Jul. 27, 1990

Related U.S. Application Data

[63] Continuation-in-part of Ser. No. 283,171, Dec. 9, 1988, Pat. No. 5,040,170.

[51] Int. Cl.⁵ .............................................. H04J 14/08
[52] U.S. Cl. ...................................... 370/84; 370/108; 359/118
[58] Field of Search ............... 370/4, 84, 99, 100.1, 370/102, 105.3, 108; 375/118; 359/115, 118, 135

[56] References Cited

U.S. PATENT DOCUMENTS

| | | | |
|---|---|---|---|
| 4,644,535 | 2/1987 | Johnson et al. | 370/99 |
| 4,658,152 | 4/1987 | Walters | 370/84 |
| 4,697,262 | 9/1987 | Segal et al. | 370/84 |
| 4,719,624 | 1/1988 | Bellisio | 370/110.1 |
| 4,731,878 | 3/1988 | Vaidya | 455/600 |
| 4,760,573 | 7/1988 | Calvignac et al. | 370/99 |
| 4,834,483 | 5/1989 | Arthurs et al. | 350/96.16 |
| 4,852,128 | 7/1989 | Lill | 375/117 |
| 4,855,999 | 8/1989 | Chao | 370/112 |
| 4,899,333 | 2/1990 | Roediger | 370/60 |
| 4,914,429 | 4/1990 | Upp | 340/825.8 |
| 4,928,275 | 5/1990 | Moore | 370/102 |
| 4,935,921 | 6/1990 | Ishizaki et al. | 370/58.1 |
| 5,040,170 | 8/1991 | Upp et al. | 370/99 |

*Primary Examiner*—Douglas W. Olms
*Assistant Examiner*—Melvin Marcelo
*Attorney, Agent, or Firm*—David P. Gordon

[57] ABSTRACT

An apparatus and method for transferring a data payload (SPE) from a first substantially SONET signal into a second substantially SONET signal of different frequency is provided. The apparatus has: a circuit for extracting the SPE from the first SONET signal and sending the bytes of the SPE, according to a first clock, to a FIFO for storage; a circuit for obtaining the SPE bytes from the FIFO according to a second clock, for building the SPE into the second substantially SONET signal; and a circuit for comparing the relative byte phases of the first and second clocks. The byte phase comparison circuit serves two functions. In order to avoid read/write conflicts in the FIFO, it generates and sends a signal to the extracting circuit which causes the extracting circuit to change the byte phase (i.e. timing) at which bytes are sent to the FIFO. Also, in order to adjust the SPE for frequency differences between the first and second substantially SONET signals, the byte phase comparison circuits sends a signal to the circuit which builds the second substantially SONET signal when the two SONET signals have slipped a byte relative to each other. In response thereto, the second substantially SONET signal building circuit generates a negative or positive stuff.

49 Claims, 12 Drawing Sheets

FIG. 4
PRIOR ART
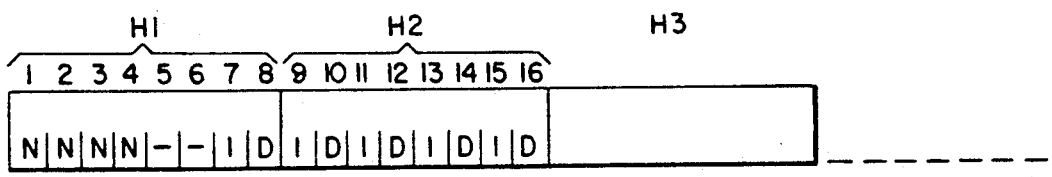
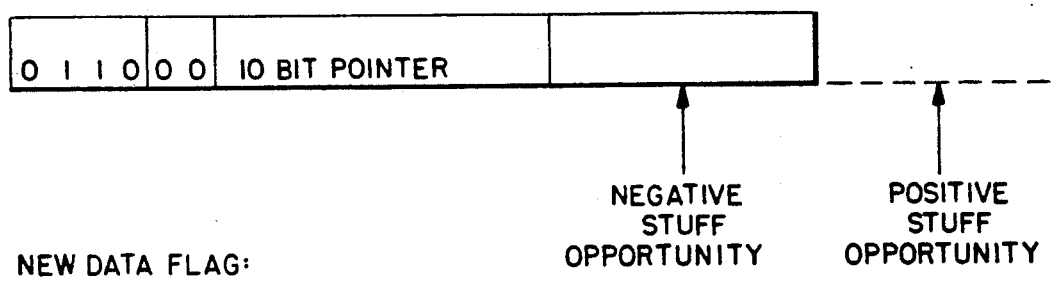
NEGATIVE STUFF OPPORTUNITY
POSITIVE STUFF OPPORTUNITY
NEW DATA FLAG:
  INVERT 4 N BITS
  ACCEPT EXACT MATCH
NEGATIVE STUFF:
  INVERT 5 D BITS
  ACCEPT MAJORITY VOTE
POSITIVE STUFF
  INVERT 5 I BITS
  ACCEPT MAJORITY VOTE
I - INCREMENT BIT
D - DECREMENT BIT
N - NEW DATA FLAG BIT

METHOD AND MEANS FOR TRANSFERRING A DATA PAYLOAD FROM A FIRST SONET SIGNAL TO A SONET SIGNAL OF DIFFERENT FREQUENCY

This is a continuation-in-part of Ser. No. 07/283,171 filed on Dec. 9, 1988, entitled "System for Cross-Connecting High Speed Digital Signals", assigned to the assignee hereof, and which is hereby incorporated by reference herein in its entirety, now U.S. Pat. No. 5,040,170.

BACKGROUND OF THE INVENTION

This invention relates generally high speed digital telecommunication systems. The invention more particularly relates to retiming circuits and methods for SONET (synchronous optical network) signals.

The telecommunications network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

In attempting to accommodate the protocols, equipment, and cables of the past while providing for the direction of the future, various standards and system requirements relating to fiber optic cables have been adopted. In particular, the T1 Standards Committees of ANSI have provided a draft document ANSI T1.105-1988 dated Mar. 10, 1988 which sets forth specifications for a rate and format of signals which are to be used in optical interfaces. Additional details and requirements are set forth in Technical Advisory publications SR-TSY-000202, --000233, -000253, -000303 Issue 3 of Bell Communication Research (Bellcore). The provided specifications detail the SONET standard. SONET defines a hierarchy of multiplexing levels and standard protocols which allow efficient use of the wide bandwidth of fiber optic cable, while providing a means to merge lower level DS0 and DS1 signals in a common medium. In essence, SONET establishes a uniform, standardized transmission and signaling scheme which provides a synchronous transmission format that is compatible with all current and anticipated signal hierarchies. Because of the nature of fiber optics, expansion of bandwidth is easily accomplished.

A basic SONET signal, termed an STS-1 signal, is seen in FIG. 1. The SONET signal is a 51.84 Mhz, bit serial signal, having nine rows of ninety columns of eight bit bytes at a 125 microsecond frame rate. The first three columns of bytes in the SONET signal are termed the transport overhead (TOH) bytes and are used for various control purposes as indicated in FIG. 2. The remaining eighty-seven columns of bytes constitute the STS-1 Synchronous Payload Envelope (SPE) as seen in FIG. 3.

Turning to FIG. 2, it is seen that the first two bytes A1 and A2 of the transport overhead are framing bytes which contain a specified framing pattern allowing synchronization of the basic SONET STS-1 signal. Three other bytes, H1, H2, and H3 form a pointer giving explicit information as to the location of the start of the SONET SPE (i.e. the "SPE phase"). The pointer bytes are required due to the fact that the position of the SPE is not fixed in time in the STS-1 frame, but is allowed to be displaced in time (i.e. a change in the location of the SPE in the frame over time constituted an SPE "phase" shift). Hence, as seen in FIG. 3, a single SPE is seen to typically straddle two consecutive STS-1 frames As seen in FIG. 4 which sets forth the payload pointer coding, the pointer for the SPE is located in the last ten bits of the word formed by bytes H1 and H2. The pointer value is an offset value and designates the location after byte H3 of the first byte of the SPE. If the pointer value is zero (i.e. zero offset), the first byte of the SPE is located in the first byte position after the H3 byte. If the pointer value equals one, the SPE starts at the second byte past byte H3. The greatest value allowed for the pointer is seven hundred eighty-two (equal to 810 minus 27 minus 1; 810 bytes in the frame, less 27 bytes for the TOH, less one byte to find the final location). The value of seven hundred eighty-two indicates, as seen in FIG. 5 which shows byte locations, that the SPE starts at the last byte position before the H1 byte of the next STS-1 frame.

As indicated in FIGS. 4 and 5, during normal operation, two kinds of pointer adjustments are allowed. A negative stuff is utilized when the SPE being transported is running at a frequency higher than that of the STS-1 envelope (i.e. additional information must be inserted into the envelope), while a positive stuff is utilized where the SPE is running at a frequency slower than the STS-1 signal (i.e. stuff bytes are inserted into the envelope). Regardless, the SPE phase is moved by one byte, forward or backward in time (the SPE "phase" is retarded or advanced relative to the envelope itself).

While the SONET specifications provide standards which permit the SONET SPE to float within the STS-1 envelope, details of means for taking the SPE of one STS-1 envelope and inserting into the envelope of another STS-1 signal for transport are not known in the art. Clearly, then such means are needed.

SUMMARY OF THE INVENTION

It is therefore an object of the invention to provide a method and means for transferring a data payload from a first substantially SONET signal to a second substantially SONET signal of different frequency and SPE phase.

It is another object of the invention to detect a difference in frequency between two SONET signals and to provide means for generating an appropriate stuff signal in response thereto.

It is a further object of the invention to provide a means for adjusting a phase indicator of an SPE in response to the generating of stuff signals.

In accord with the objects of the invention, an apparatus for transferring a data payload (SPE) from a first substantially SONET signal into a second substantially SONET signal of different frequency and phase is provided. In broad terms, the apparatus has a circuit for extracting the SPE from the first SONET signal and sending the SPE bytes to a FIFO for storage, a circuit for obtaining the SPE bytes from the FIFO and for building the, into the second substantially SONET signal, and a circuit for comparing the relative byte phases of the incoming and outgoing signals The byte phase comparison circuit serves two functions. First, in order to avoid read/write conflicts in the FIFO, the byte phase comparison circuit sends a signal to the extracting circuit which changes the byte phase (i.e. timing) at which bytes are sent to the FIFO so as to avoid conflict with the times at which bytes are read from the FIFO. Second, in order to adjust the SPE for frequency differences between the substantially SONET signals, the byte phase comparison circuit sends a signal to the circuit which builds the second substantially SONET signal when the two SONET signals have slipped a byte relative to each other. In response thereto, the second substantially SONET signal building circuit generates a negative or positive stuff.

A better understanding of the SONET payload transfer apparatus as well as additional objects and advantages of the invention will become apparent to those skilled in the art upon reference to the detailed description and the accompanying drawings.

BRIEF DESCRIPTION OF THE DRAWINGS

FIG. 4 is a diagram showing the payload pointer coding for a SONET signal payload according to the Bellcore TA-TSY-00253 prior art document;

DETAILED DESCRIPTION OF THE PREFERRED EMBODIMENT

The data payload transfer apparatus of the invention finds practical use in a device which receives a first signal in a first time domain which is in either a substantially SONET format (i.e. a signal in SONET form having its virtual tributaries as well as at least the A1, A2, H1, and H2 overhead bytes defined) or which is in a format containing at least a payload envelope (analogous to the SPE) with a gapped clock and an indication of the start of the payload envelope (analogous to J1), and which transfers the data payload of that first signal into a second signal in substantially SONET format which is in a second time domain. For purposes herein, it should be noted that "substantially SONET format" as defined herein is slightly different than that defined in the parent application hereto, as the H4, V1 and V2 bytes are not particularly required for carrying out this invention. It should also be noted that while the invention will hereinafter be described with reference to the transfer of a data payload from a first signal in substantially SONET format to a second signal in substantially SONET format, the discussion may be applied by those skilled in the art to the non-SONET to SONET data payload transfer where the non-SONET signal has the previously described requirements.

The interfacing of the different time domains is typically a requirement of switching networks, and the data payload transfer means of the invention is advantageously used in systems for cross-connecting high speed digital signals such as disclosed in Ser. No. 07/283,171 previously incorporated by reference herein. Because the substantially SONET formatted signals are in different time domains, they typically are of slightly different frequency and are out of phase (i.e. SPE phase) with each other. For example, the SONET STS-1 format permits different frequencies of ±20 ppm on the base frequency of 51.84 MHz, and also permits SONET signals to be of different SPE phases as the payload location within the SONET frame can slide.

Figure 1:
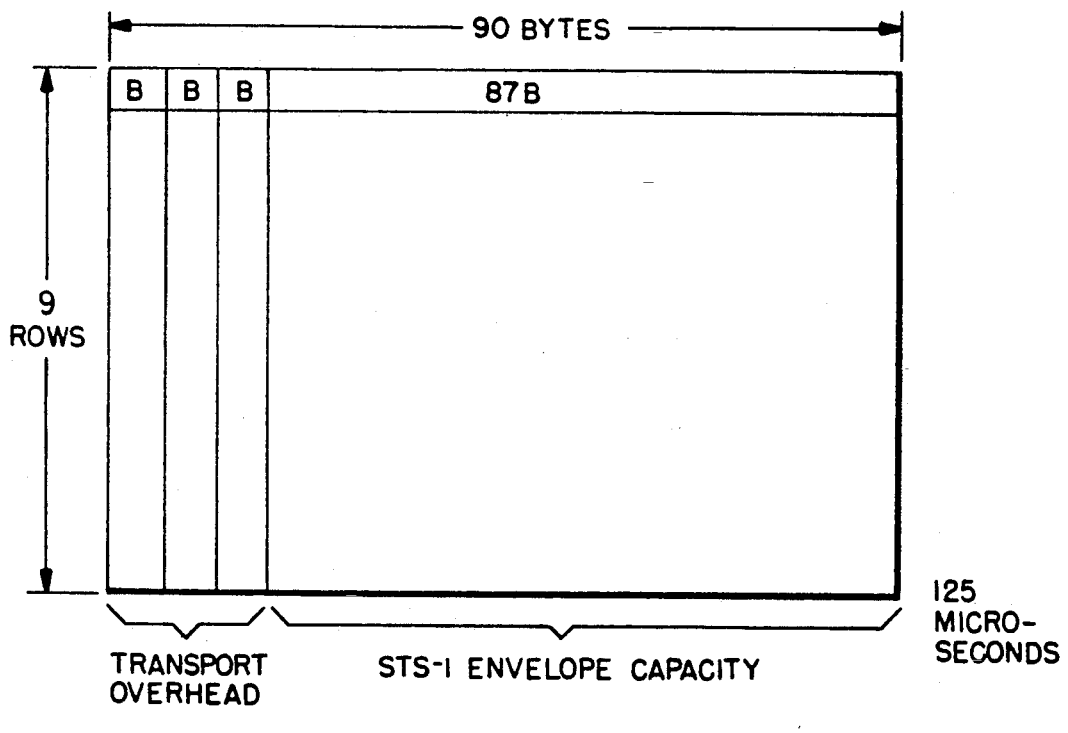
FIG. 1 is a schematic diagram of the layout of a SONET signal frame according to the Bellcore TA-TSY-00253 prior art document.
Figure 2:
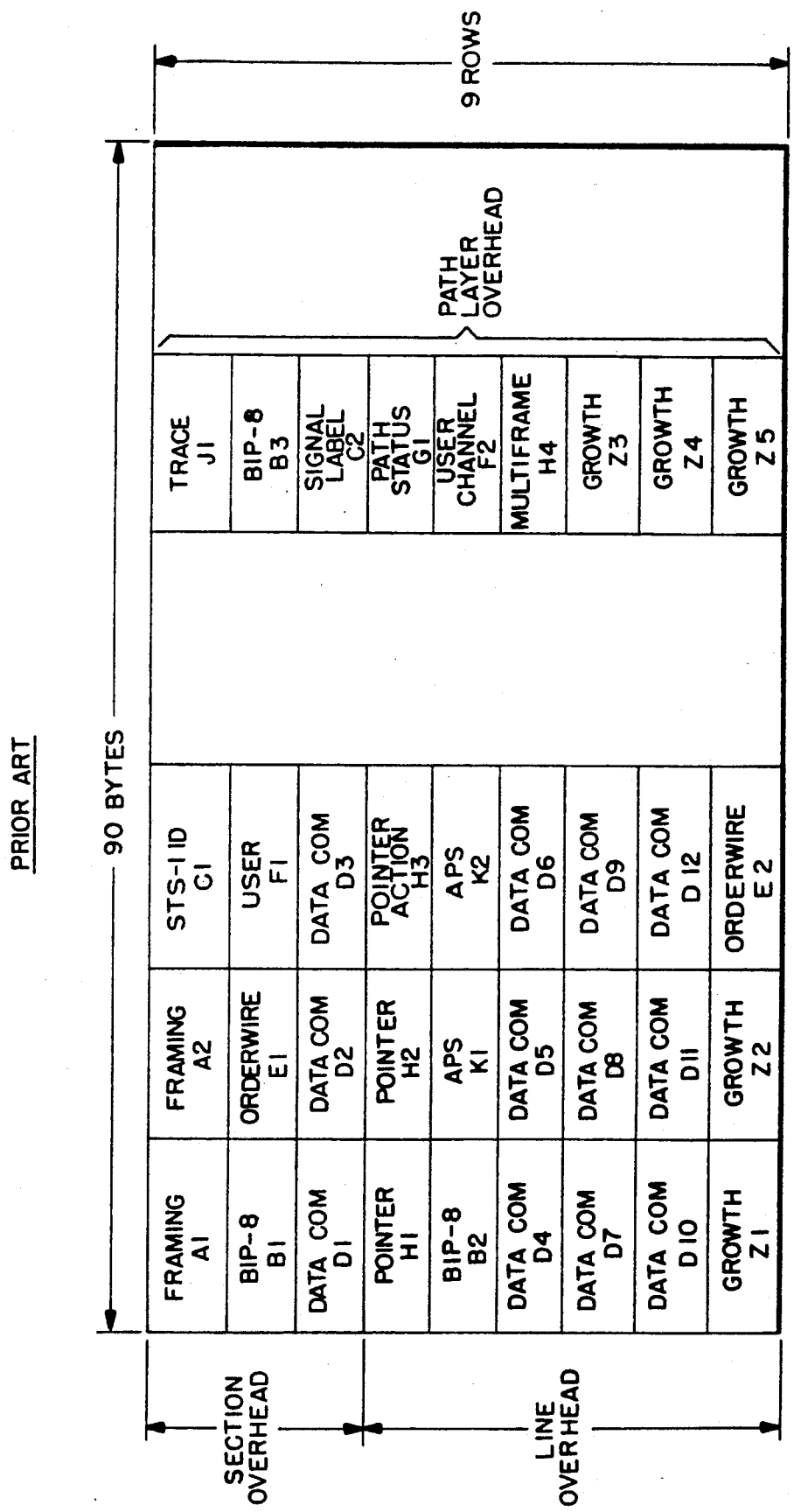
FIG. 2 is a diagram of the overhead byte location in a SONET signal frame according to the Bellcore TA-TSY-00253 prior art document.
Figure 3:
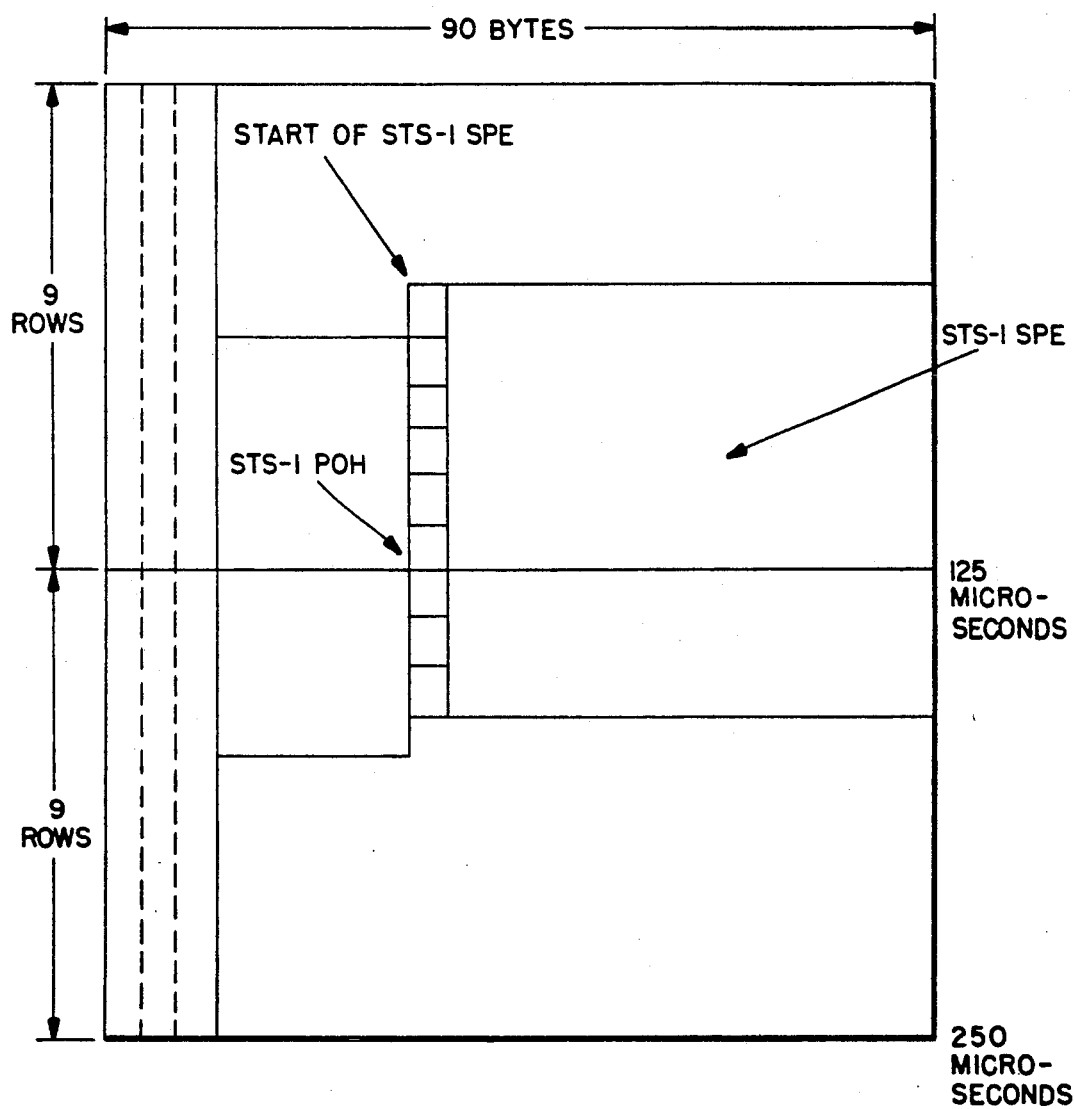
FIG. 3 is a diagram of a typical location of the SONET payload within two SONET signal frames.
Figure 5:
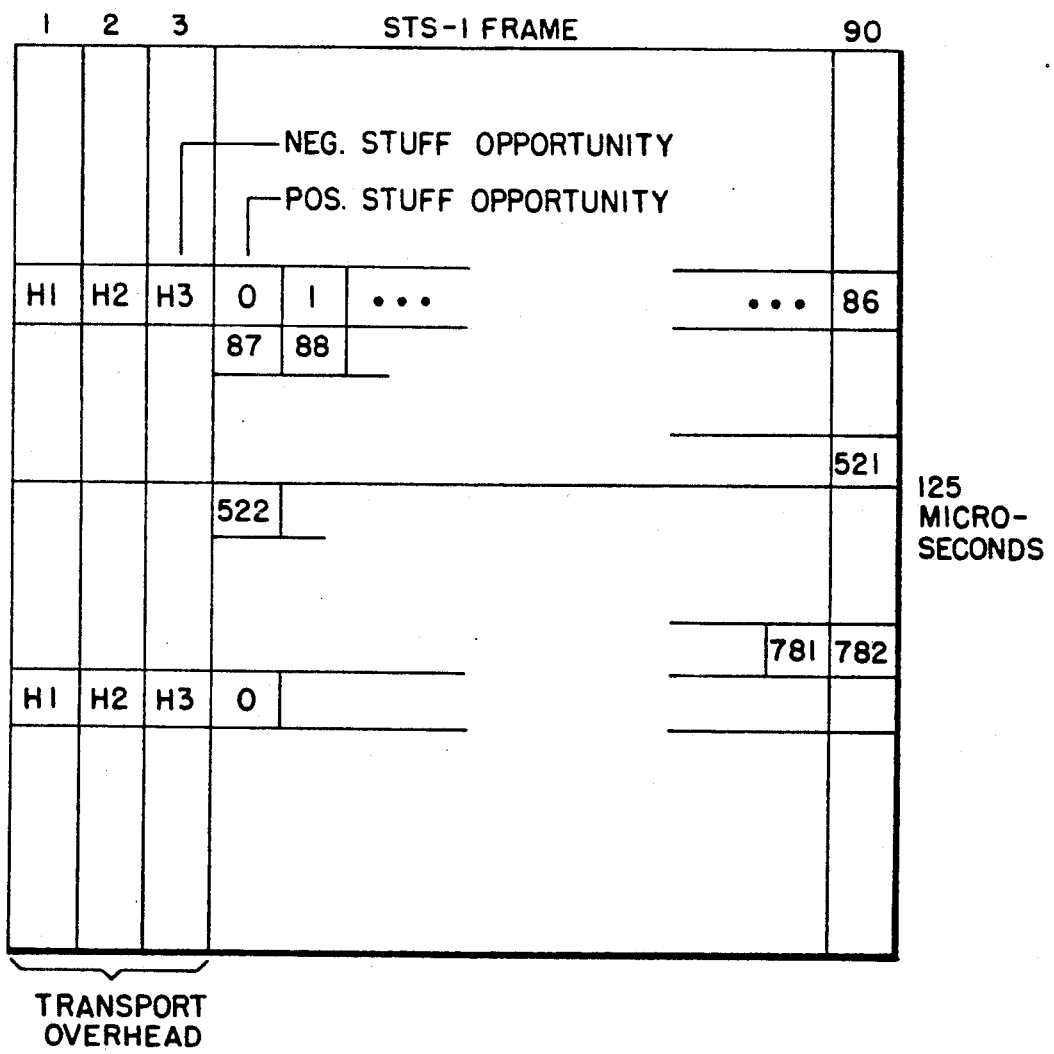
FIG. 5 is a diagram showing the SONET signal payload pointer offset numbering scheme according to the Bellcore TA-SY-00253 prior art document.
Figure 6:
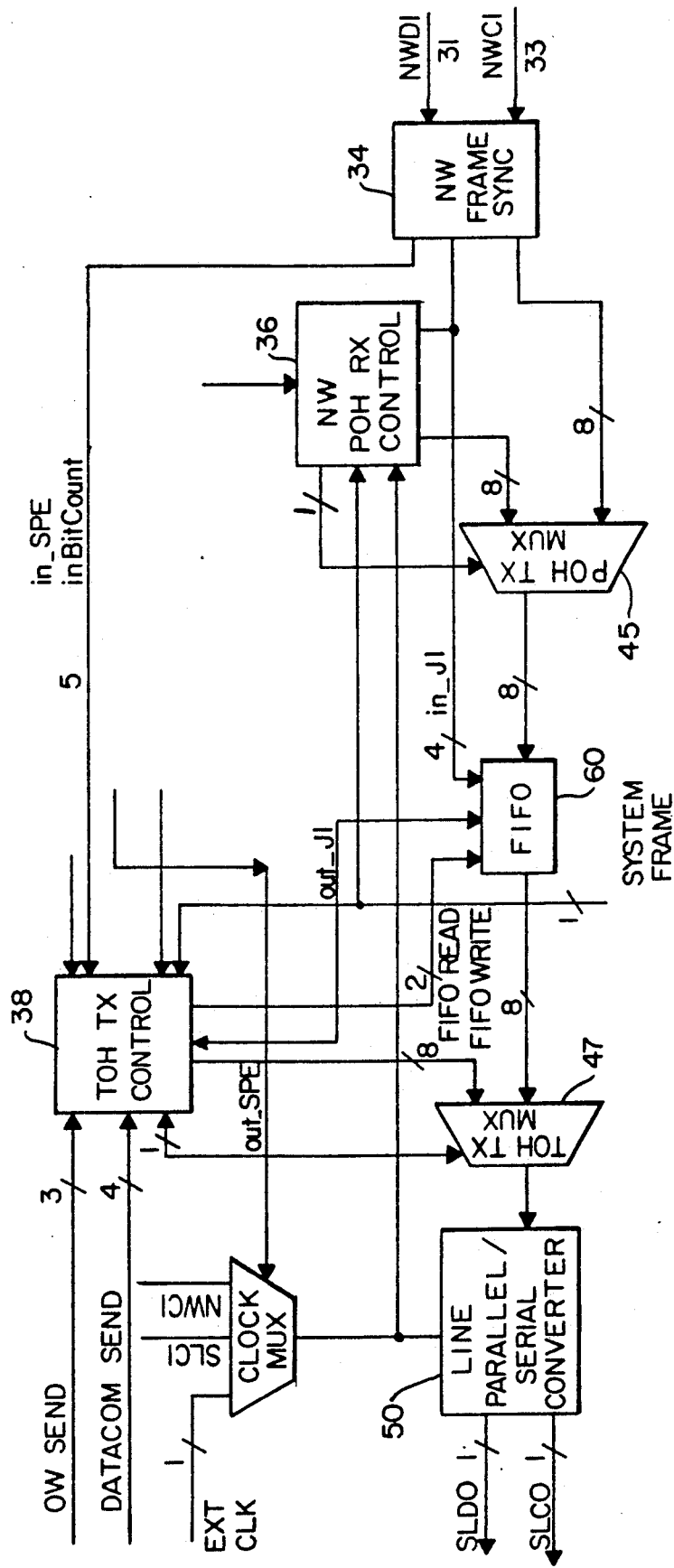
FIG. 6 is a block diagram of a SONET path terminator/originator in which the data payload transfer means of the invention can be utilized.

Turning to FIG. 6 (which is taken from FIG. 4 of the parent application Ser. No. 07/283,171 and slightly modified), the data payload transfer means 20 of the invention (shown in FIG. 7) is seen as several blocks of the transmit side of the SONET path terminator device of the cross-connect system of Ser. No. 07/283,171. The data payload transfer means 20 basically includes the frame sync block 34, the transport overhead control block 38, the transport overhead (TOH TX) multiplexer 45, and a FIFO 60 which is inserted between the frame sync block 34 and the TOH TX multiplexer 45.

As shown in FIG. 6, and in context of the parent application hereto, the frame sync block 34 receives a bit serial signal 31 at a nominal rate of 51.84 Mbit/sec from a switch in the cross-connect system along with a synchronized clock signal 33. The frame sync block 34 searches for and locks to the synchronization dictated by SONET bytes A1 and A2, and uses the SONET byte locations to extract the SONET payload envelope as well as to keep track of the frame byte numbers of the incoming data. The bytes of the received signal are then multiplexed by a path overhead transmit multiplexer (POH TX mux) 45 with bytes generated by the path overhead transmit control block 36. As will be described hereinafter with reference to FIG. 7, the data and path overhead are sent via the POH TX mux 45 to a FIFO 60. The information in the FIFO 60 is then multiplexed with control information generated by the transport overhead transmit (TOH TX) control 38. The TOH TX control 38 conducts pointer calculations to permit the envelope of the outgoing line STS-1 signal to be formed. The SONET payload envelope signal received must be retimed (in frequency) to the selected line output clock, and must be synchronized in SPE phase to the output by the recalculating of a new STS-1 pointer value New values for the STS-1 pointer bytes H1, H2, and H3 are calculated by the TOH TX control 38, and and a phase slip detector is included therein (as discussed with reference to FIG. 7) to allow for stuff operations on the outgoing signal Preferably, the TOH TX control module 38 also calculates the BIP-8 B2 parity Regardless, the output from FIFO 60 and the TOH TX control 38 are multiplexed by the TOH TX mux 47 into an STS-1 signal properly timed to the line output clock, with a proper SPE, and with proper path and transmit overhead information. The STS-1 byte signal is sent to the line parallel to serial converter 50 which converts the signal into a bit serial 51.84 Mbit/sec STS-1 signal with an accompanying clock signal.

Figure 7:
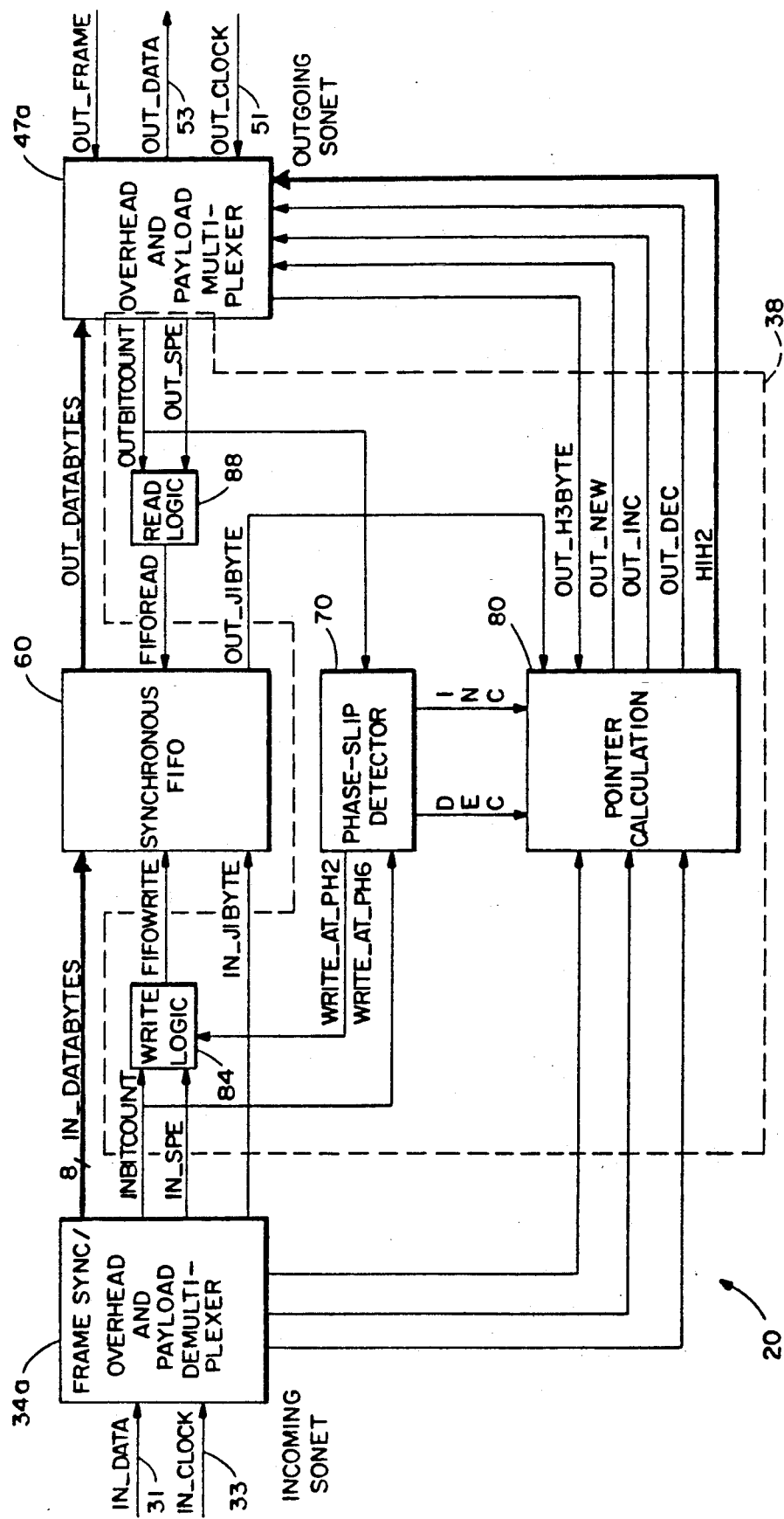
FIG. 7 is a block diagram of the data payload transfer means of the invention.

Turning to FIG. 7, the data payload transfer means 20 of the invention is seen with a frame sync/demultiplexer block 34a, the transport overhead control 38, FIFO 60, and a multiplexer block 47, The frame sync-/demultiplexer block 34a effectively include the FRAME SYNC block 34, the POH RX control 36, and the POH TX mux 45 of FIG. 6, while the multiplexer block 47a includes the TOH TX mux 47 and some processing circuitry of the TOH TX control 38 of FIG. 6. As indicated in FIG. 7, the transport overhead control 38 includes a phase-slip detector 70, a pointer calculator 80, a write logic block 84, and a read logic block 88.

The frame sync/demultiplexer block 34a in its frame sync capacity preferably includes a decoder (not shown) and a shift register (not shown). The frame sync block 34a receives a bit serial data signal 31 and a clock signal 33 and uses the clock signal to clock the data into the shift register. The decoder of the frame sync block is used to synchronize the frame sync block 34a with the frame of the incoming data so that the frame sync block 34a can find appropriate pointers in the substantially SONET formatted signal and extract the synchronous payload envelope (SPE) from the incoming substantially SONET formatted signal. Through use of the shift register, the SPE is taken out of the frame sync block 34a by write logic 84 in bytes of eight bits. Signals generated by the frame sync block 34a include: In_SPE which is high when the bytes being read from the frame sync block 134 are the synchronous payload envelope (SPE) bytes; inBitCount which indicates phases zero through seven of the byte period (i.e. the "byte phase"); in_J1byte which indicates the beginning of the incoming SPE; and in_NEW, in_INC, and in_DEC which indicate a positive or negative drift, or a jump (reset) in the SPE phase of the incoming signal. Data is written into the FIFO 60 only when in_SPE is high. Also, as will be discussed hereinafter, the in_J1byte signal accompanies the J1 byte through the FIFO.

Data bytes assembled in the frame sync block 34a are written into FIFO 60 by the write logic block 84 while the in_SPE signal is high In the preferred embodiment, the write logic block includes two counter decodes, one of which selects phase 2, and the other of which selects phase 6 of the incoming byte phase depending upon the indication provided by the phase-slip detector as hereinafter described. The write logic block 84 uses the decoded count to generate the write pulse for the FIFO.

The synchronous FIFO 60 is a nine bit (eight bits for a data byte, and a one bit indicator to indicate the J1 byte) by sixteen word deep FIFO. The FIFO 60 is preferably a RAM, and may be advantageously implemented using a single port static RAM, provided the RAM is not read from and written to simultaneously.

In assembling a SONET signal for output, the bytes of data stored in FIFO 60 are read from the FIFO according to the FIFOread signals generated by the read logic block 88. The read logic block 88 utilizes the clock and framing information from the outgoing SONET signal which is effectively assembled by the multiplexer 47a. In particular, the processing section of the multiplexer 47a uses the out_Clock signal 51 to generate the outBitCount signal which is identical in form, but usually different in byte phase and/or frequency from the inBitCount signal received by the write logic block 84. The read logic block 88 includes a count decoder which generates a read pulse (i.e. FIFOread signal high) during phase 7 (outBitCount 7) of the outgoing byte period (as is described hereinafter in more detail with reference to FIG. 8) provided the out_SPE signal generated by the output multiplexer 47a is high. The out SPE signal is high when payload envelope data is needed according to the phase of the frame of the outgoing SONET signal When the read pulse is generated, a byte in the FIFO 60 is sent from the FIFO 60 to the output multiplexer 47a.

The output multiplexer 47a receives not only the data payload (SPE) which is received from the FIFO 60, but the transport overhead (TOH) bytes, e.g. H1 and H2, which are received from the pointer calculation means 80. The mux 47a takes the TOH byte information, and using signals out_NEW, out_INC and out_DEC which are described in more detail hereinafter, multiplexes the H1 and H2 and other TOH bytes with the data payload into an outgoing SONET signal As generated, the outgoing SONET signal includes a data signal 53 which is clocked according to the output clock signal 51.

The pointer calculation block 80 computes and codes the output SONET pointer bytes H1 and H2. The pointer calculation block 80 has a stop/start counter (not shown) which counts the number of bytes from the outgoing H3 byte (as indicated by the start signal Out_H3 byte received from multiplexer 47a) to the beginning of the next synchronous payload envelope as indicated by the stop signal Out_J1 being read out of the FIFO 60. The out_SPE signal is used as an enable for the stop/start counter of the pointer calculation block 80. The pointer calculation block also includes a coder (not shown) which codes the H1 and H2 bytes according to the value of the start/stop counter, and additional information from signals such as in_NEW, in_INC, and in_DEC received from the frame sync block 34a, and DEC and INC received from the phase-slip detector 70.

Signals in_INC and in_DEC indicate that the phase of the incoming payload signal (SPE) has been incremented or decremented by one byte relative to the incoming overhead signal. Signals INC and DEC from the phase-slip detector 70, indicate the need for a negative or positive stuff in the outgoing signal due to the difference in frequency between incoming and outgoing clocks; a DEC requiring the insertion into byte H3 of SPE data (out_SPE being brought high at H3, and H1 and H2 being changed accordingly), while an INC requiring that the byte after the H3 byte be filled with stuff (out_SPE being kept low at the byte following H3, with changes in H1 and H2 accordingly) Using a logic block (not shown), the pointer calculation block 80 cancels pointer movements in opposite directions indicated by the incoming SONET signal and indicated by the phase-slip detector 70. In particular, if an in_DEC and and INC signal are received during a single frame, the logic block in the pointer calculation block cancels the signals and codes H1 and H2 according to the count of the start/stop counter. Similarly, if an in_INC and a DEC signal are received in a single frame, they will be cancelled. On the other hand, where both an in_DEC and a_DEC signal are received during a single frame, the SPE phase is changed by only a single byte immediately, and the second phase change is kept pending for three frames, at which time it is implemented if no in_INC or INC signals have been received. The presence of both an in_INC and an INC signal is treated similarly, with phase changes in the opposite direction. It will be appreciated by those skilled in the art, that even if the in_INC and INC (or in_DEC and DEC) signals are not received in the same frame, but within three frames of each other, a second phase move must not be carried out for three frames from the previous phase move.

The signal in_NEW indicates a change in pointer value such as might be generated when a new SONET signal is received. In response to the in_NEW signal, the FIFO 60 is reset, and the pointer calculation block 80 creates a new data flag (NDF) coding to indicate a new pointer value for the following frame, and cancels all pending out_INC and out_DEC signals.

Figure 8:
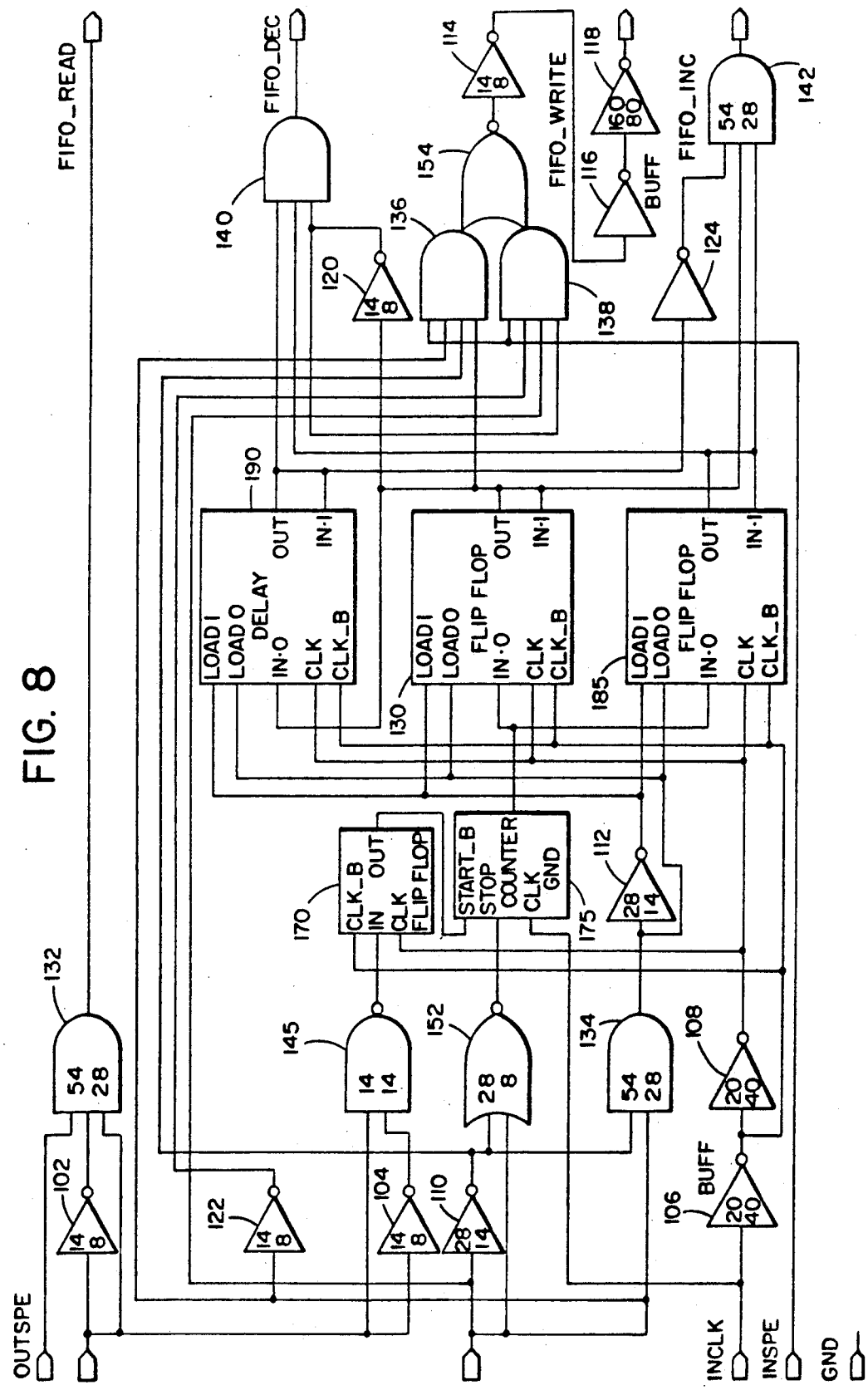
FIG. 8 is a circuit diagram of the phase slip detector of the data payload transfer means of FIG. 7.

Details of the phase-slip detector 70 of the invention are seen with reference to FIG. 8, which also shows the write logic 84 and read logic 88 circuitry. In the preferred embodiment, the phase-slip detector 70 and the write logic 84 and read logic 88 includes eleven inverters 102, 104, 106, 108, 110, 112, 114, 116, 118, 120, and 122, six AND gates 132, 134, 136, 138, 140 and 142, a NAND gate 145, two NOR gates 152 and 154, a flip-flop 170, a start/stop four bit Johnson counter 175, and three double input flip-flops 180, 185, and 190. The function of the phase-slip detector 70 is to 9enerate a FIFO increment signal when the number of words stored in the FIFO is decreased by one (i.e. the outgoing clock rate is greater than the incoming clock rate), and a FIFO decrement signal when the number of words stored in the FIFO is increased by one (i.e. the incoming clock rate is greater than the outgoing clock rate). In response to the FIFO increment and FIFO decrement signals output by the phase-slip detector 70, the pointer calculation means 80 adjusts its H1H2 pointer, and positive and negative stuffs are generated as previously described.

The phase-slip detector 70 receives as inputs the inBitCount, outBitCount, in_SPE, and out_SPE signals generated by the frame sync block 34a and the output mux 47a, as well as the in_Clock signal which is also received by the frame sync block 34a. In the preferred embodiment, the inBitCount and outBitCount signals are four bit Johnson counter signals such that eight phases of each signal are represented as follows:

| Phase | Hex representation | Bit 3 | Bit 2 | Bit 1 | Bit 0 |
|---|---|---|---|---|---|
| 0 | 0 | 0 | 0 | 0 | 0 |
| 1 | 1 | 0 | 0 | 0 | 1 |
| 2 | 3 | 0 | 0 | 1 | 1 |
| 3 | 7 | 0 | 1 | 1 | 1 |
| 4 | F | 1 | 1 | 1 | 1 |
| 5 | E | 1 | 1 | 1 | 0 |
| 6 | C | 1 | 1 | 0 | 0 |
| 7 | 8 | 1 | 0 | 0 | 0 |

In order to create a FIFO read signal, the read logic 88 block utilizes the outBitCount and the out_SPE signals generated by the mux 47a. Phase 2 of the outBitCount signal is inverted by inverter 102, and the inverted phase 2 is fed along with phase 3 and the out_SPE signal to AND gate 132 to generate the FIFO read signal. In this manner, a FIFO read signal is generated every time Bit 2 is low (0) and Bit 3 is high (1); i.e. phase 7 of the outBitCount; provided, of course that the out_SPE signal is high to signify the need for payload data.

The generation of the FIFO write signal is more complex, as the FIFO write signal is generated on either phase 2 or phase 6 of the inBitCount depending upon the circumstances. The FIFO write signal is generated by logic, some of which is also used to generate the FIFO increment and FIFO decrement signals.

In generating the FIFO write, FIFO increment, and FIFO decrement signals, Bit 1 of the Johnson count outBitCount signal is fed to inverter 104. The output of inverter 104 is fed together with Bit 2 of the outBitCount signal to NAND gate 145. Inverter 104 and NAND gate 145 effectively supply a not phase 6 signal, as the only time NAND gate 145 will go low is when Bit 2 is high and Bit 1 is low; i.e. phase 6 of the outBitCount. Flip-flop 170 takes the not phase 6 signal, and at the next clock signal of the in_Clock provided by the output of buffer inverters 106 and 108 on the in_Clock signal, provides a pulse to the start input of the start/stop Johnson counter 175. Effectively, then, the start/stop counter 175 starts counting at the first in_Clock signal after phase 6 of the outBitCount.

The stop input of start/stop Johnson counter 175 is controlled by the inBitCount. Bit 1 of the Johnson count inBitCount signal is fed to inverter 110. The output of inverter 110 is fed together with Bit 0 to NOR gate 152. Inverter 110 and NOR gate 152 effectively supply a phase 5 signal of the inBitCount, as the only time NOR gate 152 goes high is when the Bit 0 input is low and when the output from inverter 110 is low (Bit 1 is high); i.e. phase 5 of the inBitCount. Because the stop/start counter 175 has a built in delay of one cycle, the stop of the count actually occurs at phase 6 of the inBitCount. As a result, start/stop Johnson counter 175 counts from the first in-Clock pulse after phase 6 of the outBitCount until phase 6 of the inBitCount.

The least significant bits (0 and 1) of the output count of the start/stop Johnson counter 175 are fed respectively to the in0 inputs of two input flip-flops 185 and 180 (flip-flop 185 getting bit 0, and flip-flop 180 getting bit 1). The in0 inputs are only loaded with the values when the load0 inputs of the flip-flops are high. The load0 inputs are generated by supplying the output of inverter 110 (not Bit 1) and Bit 2 to AND gate 134 and by using the output of AND gate 134 as the load0 input. Since not Bit 1 and Bit 2 are high only at phase 6, the output of AND gate 134 supplies a inBitCount phase 6 signal. Hence, the in0 inputs of the two input flip-flops 180 and 185 are loaded with bit values from the start/stop Johnson counter 175 only during phase 6.

The phase 6 output of AND gate 134 is also inverted by inverter 112, thereby providing a not phase 6 signal which is high during all phases except phase 6. The output of inverter 112 is fed to the load1 inputs of the two input flip-flops 180 and 185. Thus, during all phases except phase 6, flip-flops 180 and 185 output the value received at their in1 inputs. However, because the in1 inputs of flip-flops 180 and 185 are coupled to their respective out ports, flip-flops 180 and 185 recirculate the values loaded into the load0 input ports during phase 6.

By loading two input flip-flop 180 with bit 1 of the Johnson counter value from counter 175, flip-flop 180 will provide a high output if the count between outBitCount phase 6 and inBitCount phase 6 is either two, three, four or five Similarly, by loading the two input flip-flop 185 with bit 0 of the Johnson counter value from counter 175, flip-flop 185 will provide a high output if the count between outBitCount phase 6 and inBitCount phase 6 is either one, two, three or four.

The output port of flip-flop 180 is fed to the input port of two input flip-flop 190 Flip-flop 190 is also arranged with its load0 input coupled to the output of AND gate 134; its load1 input coupled to the output of inverter 112, and its in1 input coupled to its own output port for recirculation. With such a configuration, flip-flop 190 effectively outputs the value output by flip-flop 180 during the previously cycle.

The outputs from flip-flop 180, 185 and 190 are used along with additional logic to generate a FIFO write signal at appropriate phases, as well as to generate FIFO increment and FIFO decrement signals at appropriate times A four input AND gate 136 receives the output from flip-flop 180, as well as the in_SPE signal, Bit 2 of the inBitCount, and the output from inverter 110 (not Bit 1 of the inBitCount). Four input AND gate 136 provides a positive output pulse only during phase six of the inBitCount (i.e. not Bit 1, and Bit 2 are high) when the count of the stop/start counter is two, three, four, or five, and payload data is required When those requirements are met, NOR gate 154 receives the pulse and inverts it. In turn, inverters 114, 116 and 118, which also act as buffers, reinvert the output of NOR gate 154 and provide a FIFO write pulse at phase 6 of the inBit-Count.

The output of flip-flop 180 is also fed to an inverter 120 which provides a positive output when the output from flip-flop 180 is low; i.e. when the count between phase 6 of the inBitCount and phase 6 of the outBit-Count is either 0, 1, 6, or 7. The output from inverter 120 provides one of four inputs to a four input AND gate 138. The other three inputs into AND gate 138 are Bit 1 of the inBitCount, not Bit 2 of the inBitCount (as generated by inverter 122), and the in_SPE signal. Four input AND gate 138 provides a positive output pulse only during phase two of the inBitCount (i.e. not Bit 2, and Bit 1 are high) when the count of the stop/start counter is zero, one, six, or seven, and payload data is required. When those requirements are met, NOR gate 154 receives the pulse and inverts it, while inverters 114, 116, and 118 reinvert the pulse to provide a FIFO write pulse at phase 2 of the inBitCount.

The output of inverter 120 is also fed to a three input AND gate 140, which has the output from delay flip-flop 190 and the output from flip-flop 185 as its other inputs. The output from AND gate 140 goes high only when the present output from flip-flop 180 is low (i.e. the present count from start/stop counter is zero, one, six or seven) the output from delay flip-flop 190 is high (i.e. the previous count from start/stop counter was two, three four or five), and the output from flip-flop 185 is high (i.e. the present count is one, two, three or four). In other words, in the normal functioning of the phase-slip detector, AND gate 140 provides a high output only when the count registered by the start/stop counter 175 changes from two to one. In such a situation, as is discussed in more detail hereinafter, the incoming data is available to the FIFO at a higher rate than the outgoing dta is being clocked out. Because the available data must be clocked into the FIFO, and in order to avoid data from filling up the FIFO and overwriting itself, the FIFO decrement signal is used to inform the point calculation means 80 and the TOH mux 47a that a positive stuff should be utilized to extend the length of the out_SPE signal so as to accommodate an extra byte in a payload, and that the H1H2 and H3 bytes should be recalculated accordingly.

Another three input AND gate 142 is utilized to generate a FIFO increment signal. The inputs into three input AND gate 142 are the output port signals from flip-flops 180 and 185, and the inverted output from delay flip-flop 190 which is inverted by inverter 124. With those three inputs, the output of AND gate 142 only goes high when the present count from the start/stop counter 175 is two, three, or four (which is the logical AND of the outputs from flip-flops 180 and 185), and the previous count was zero, one, six, or seven. In other words, in the normal functioning of the phase-slip detector, AND gate 142 provides a high output only when the count registered by the start/stop counter 175 changes from one to two. In such a situation, as is described in greater detail hereinafter, the incoming data is available to the FIFO at a slower rate than the outgoing data is being clocked out. In order to avoid underflow of data in the FIFO, the FIFO increment signal is used to inform the pointer calculation means 80 and the TOH mux 47a that a negative stuff should be utilized to reduce the length of the out SPE_signal so as to have one less byte in a payload, and that the H1H2 and H3 bytes should be recalculated accordingly.

In sum, the phase-slip detector 70 receives the bit counts of both the incoming and outgoing SONET signals (inBitCount and outBitCount), and compares their phases (i.e. the byte phase). If the difference between their phases is two or more (i.e. the start-stop counter has a value of 2, 3, 4, 5), then the write logic causes data to be written into FIFO 60 during phase 6. If the absolute value of the difference between their phases (mod eight) is less than two (i.e. the start-stop counter has a value of 0, 1, 6, or 7), then the write logic block 84 causes data to be written into FIFO during phase 2. All the while, regardless of the count, data is read out of the FIFO 60 by read logic block 88 during outBitCount phase 7. By requiring the difference between phases to be two or more, data is never read into and out of FIFO 60 at the same time.

Figure 9A:
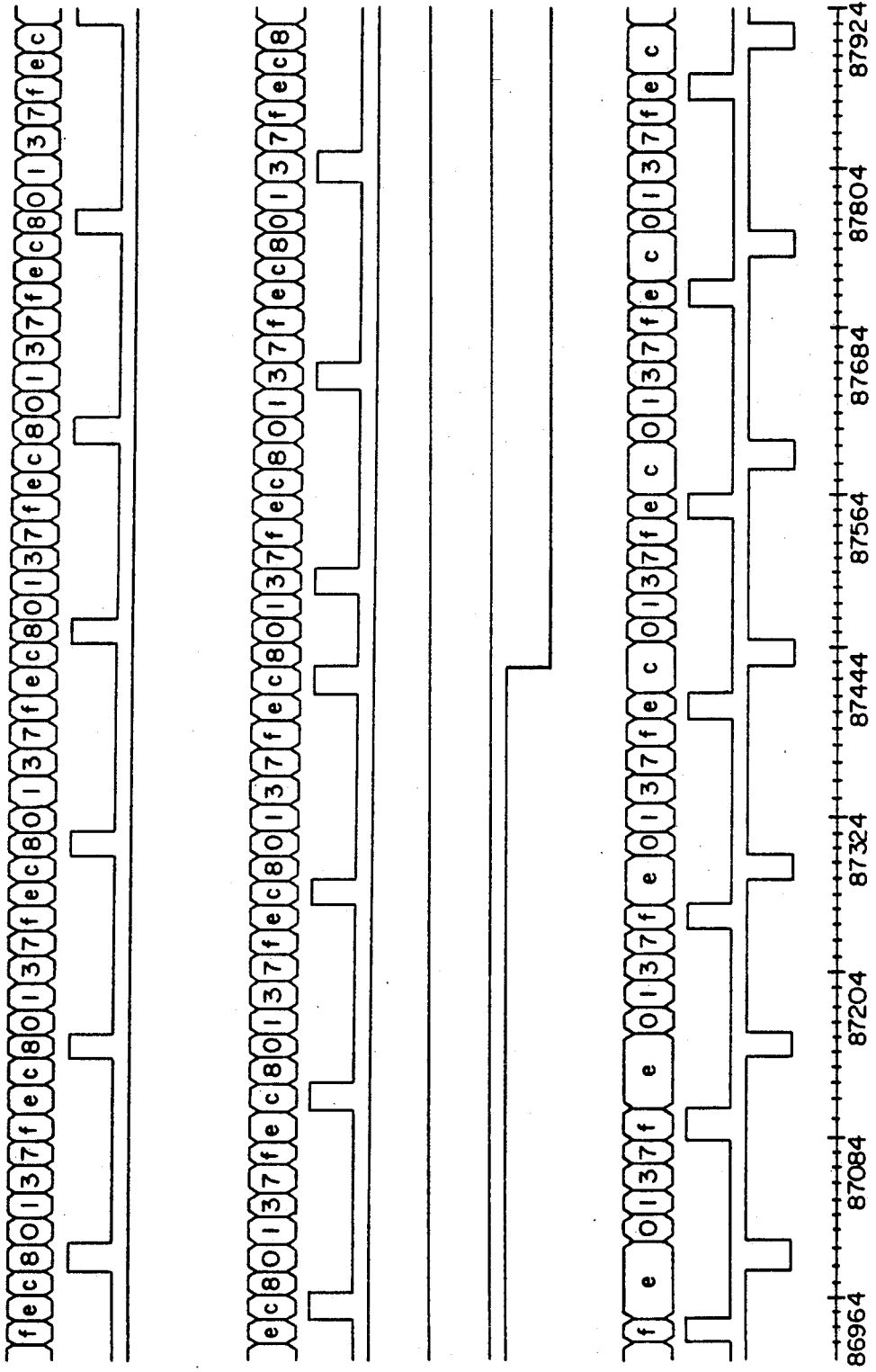
FIGS. 9a–9d are timing diagrams illustrating signals monitored and generated by the phase slip detector of FIG. 8 where the outgoing clock rate is greater than the incoming clock and vice versa.
Figure 9B:
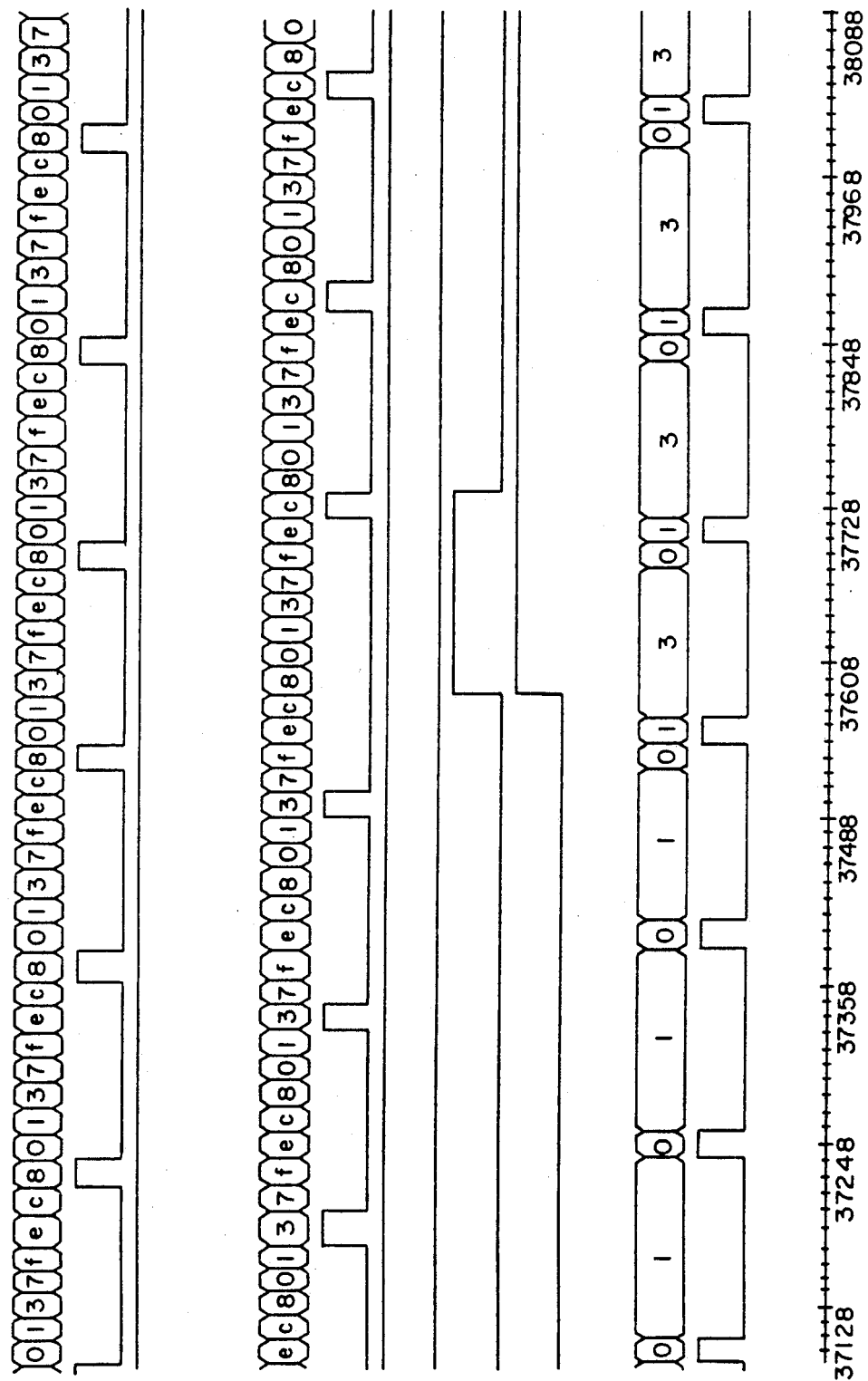

The changing of the byte phase at which the write logic block 84 causes data to be written into the FIFO 60, together with positive or neqative stuffs executed in response to the FIFO decrement or increment signals effectively accounts for the difference of frequency of the incoming and outgoing SONET signals. For example, if the incoming SONET signal is at a slightly higher frequency than the outgoing SONET signal as seen in FIG. 9a and FIG. 9b, data would tend to build up in the FIFO. This would occur because the phases of the BitCount signals (i.e. the byte phases) would change relative to each other. For example, as shown over a period of time represented in FIG. 9a, the start/stop counter which starts counting after the first in_Clock signal after outBitCount c (phase 6), and which stops counting at phase 6 (c) of the inBitCount, transitions from a count of five to a count of six. As a result, the FIFO write signal generated by write logic 84 transitions from a write signal at phase six to a write signal at phase two. That transition is seen occurring in the middle of the FIFO_write signal of FIG. 9a, with two FIFO write signals generated close together (four clock periods apart—at phase six and then at phase two). Similarly, in FIG. 9b, a transition period of time is shown where the start/stop counter moves from a count of one to a count of two. As a result, the FIFO write signal generated by write logic 84 changes from a write signal at phase two to a write signal at phase 6 This transition is seen in the middle of the FIFO write signal of FIG. 9b, with two FIFO write signals generated far apart (twelve clock periods apart —at phase two and then at the second phase six following the phase two).

The two FIFO write transitions shown in FIGS. 9a and 9b permit the FIFO write and FIFO read signals to maintain their independent speeds while guaranteeing that they do not occur simultaneously. However, because the outgoing signal (FIFO read) is faster than the incoming signal (FIFO write), each time the outgoing signal gains an entire word (e.g. eight clock periods—the start/stop counter cycling through values of e.g. five, six, seven, zero, one, two, three, and four) on the incoming signal, a data word is required but not available. As a result, a negative stuff must be generated. Thus, one of the transitions shown in FIGS. 9a and 9b must be chosen to generate the FIFO increment signal which initiates a negative stuff. As provided in the circuitry of FIG. 8, the FIFO increment signal generated by AND gate 142 correlates to the transition shown in FIG. 9b, with the count of the start/stop counter going from one to two.

Figure 9C:
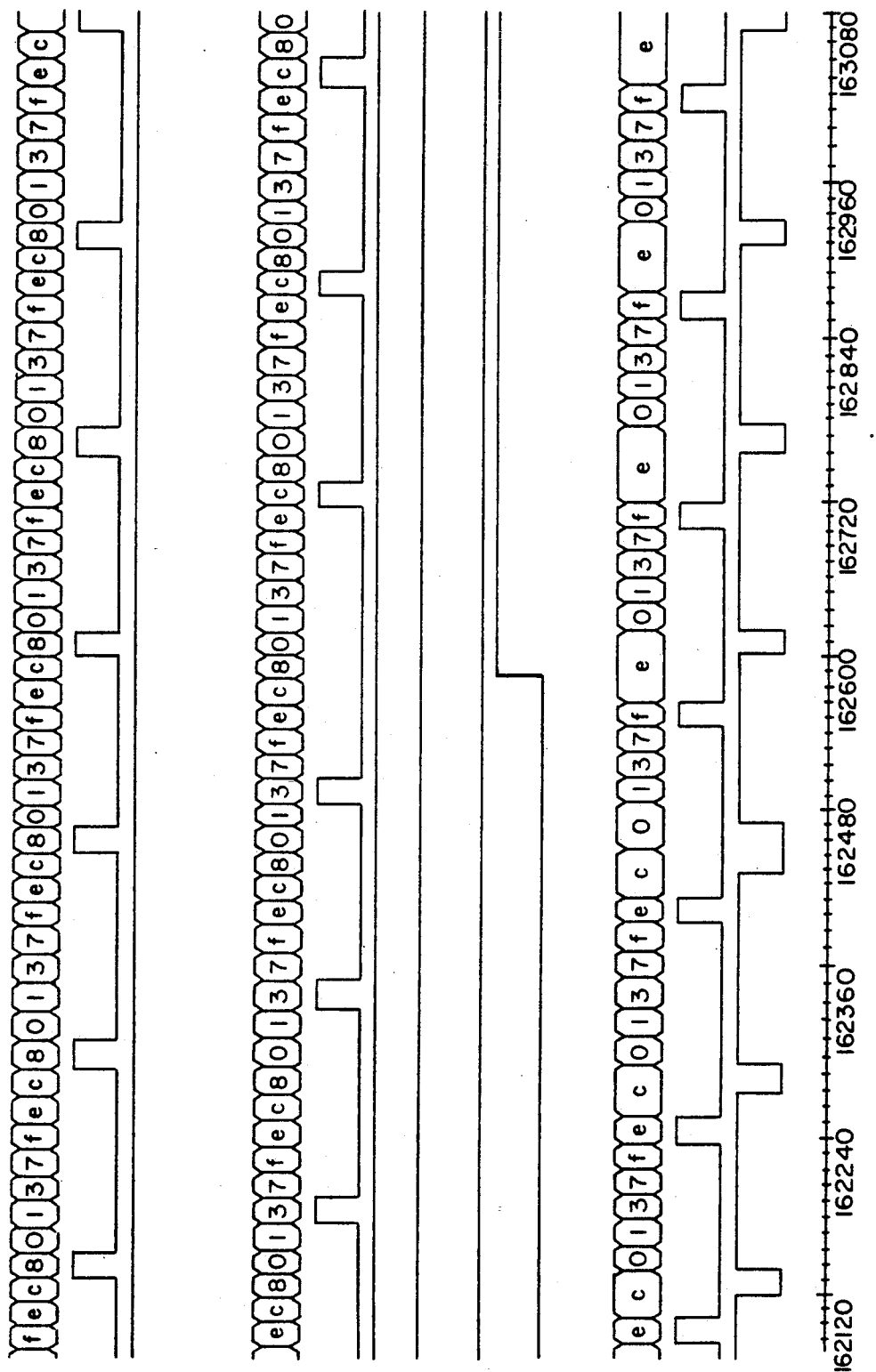
Figure 9D:
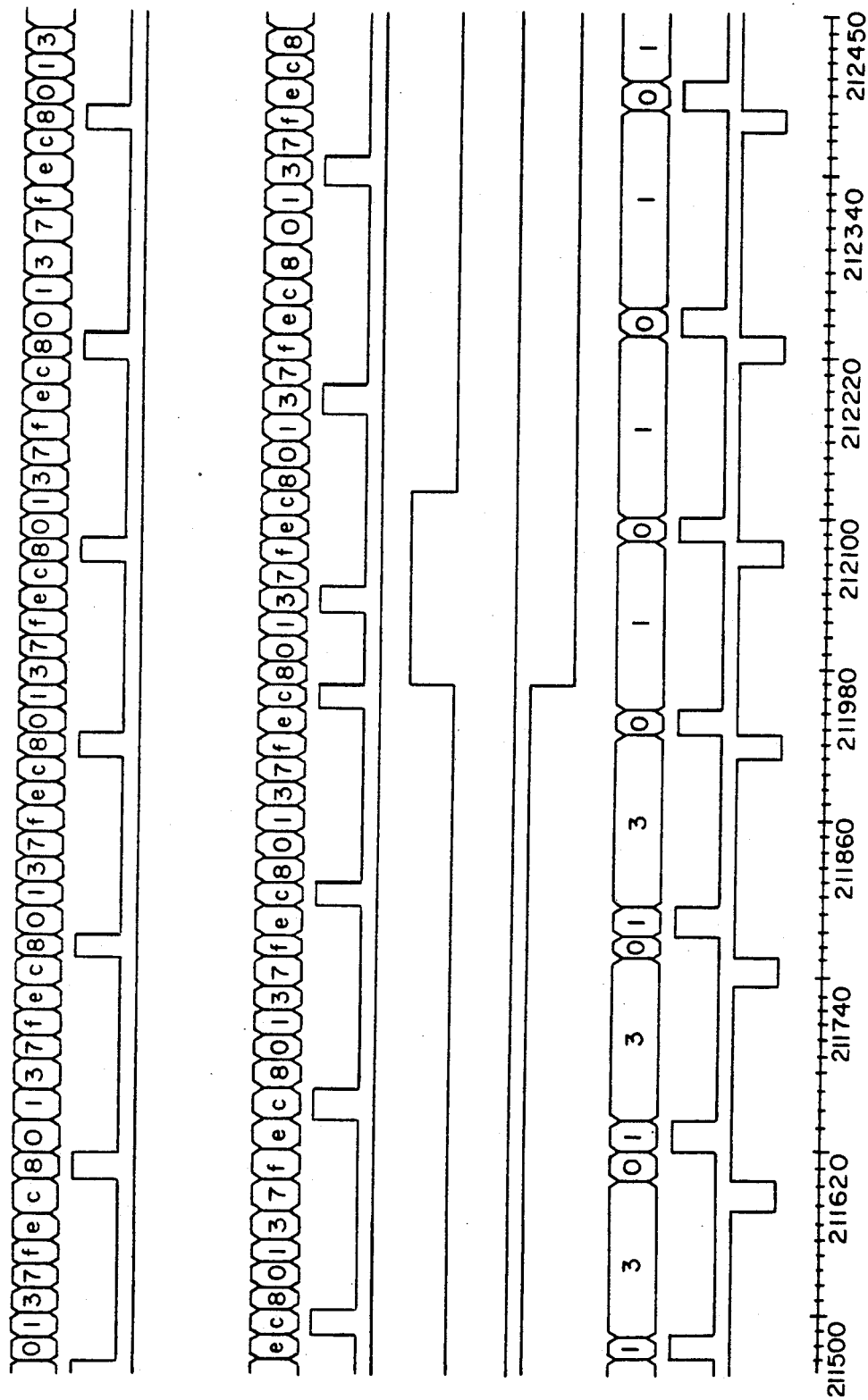

FIGS. 9c and 9d show an incoming clock having a greater rate than the outgoing clock. FIG. 9c shows the transition of the start/stop counter from a count of six to a count of five. Accordingly, the FIFO write signal is changed from being generated at phase two to being generated at phase six. After continued movement between the clocks such that the start/stop counter decreases from a count of five, to a count of four, to a count of three ..., FIG. 9d shows the transition of the start/stop counter from a count of two to a count of one. The FIFO write signal responds thereto as it is changed from being generated at phase six to being generated at phase two. Because the two phase transitions are indicative of the incoming signal gaining an entire word (e.g. eight clock cycles) on the outgoing signal, a data word is available but not taken. As a result, a positive stuff must be generated. Thus, one of the transitions of FIGS. 9c and 9d must be chosen to generate the FIFO decrement signal. As provided in the circuitry of FIG. 8, the FIFO decrement signal generated by AND gate 140 correlates to the transition shown in FIG. 9d, with the count of the start/stop counter going from two to one.

There have been described and illustrated herein methods and means for transferring a data payload from a first SONET signal of a first frequency and phase to a second SONET signal of a second frequency and phase, the methods relating directly to the apparatus. While particular embodiments of the invention have been described, it is not intended to be limited thereby, as it is intended that the invention be as broad in scope as the art will allow. Thus, those skilled in the art will appreciate that while particular phases of the inBitCount and outBitCount (e.g. phase 6) were compared for their relative position in time, any byte phase of the inBitCount can be compared to any byte phase of the outBitCount for purposes of detecting phase slip Also, while the invention was described as obtaining the inBitCount and outBitCount from clocks related to a serial bit stream, it will be appreciated that where a parallel bit stream (i.e. stream of bytes) is used as the input, the inBitCount and outBitCount can either be derived therefrom via a circuit which divides the clock, thereby artificially creating "bit times" (byte phases) for a byte signal, or the receipt or transmission of a byte itself can be utilized as the byte phase signal which starts or stops the counter which tracks phase difference Further, while it is preferable to separate the FIFO read and FIFO write signals by as much as possible (e.q. two clock cycles, where eight clock cycles are used for a data word and FIFO write can occur at either of two times, and FIFO read occurs at a given time), any phase can be utilized for the FIFO read signal, and any two phases can be used for the FIFO write signal, provided that the read and write signals do not occur simultaneously. In fact, if desired, instead of changing the phase of the FIFO write signal, the FIFO read signal may be changed, provided the overhead and payload multiplexer or line parallel/serial converter acts as a buffer or some other buffer means is provided to allow the outgoing data to be properly synchronized relative to the outgoing clock It will further be appreciated by those skilled in the art that the FIFO increment and decrement signals can be generated at any desired start/stop counter transition (not just phase two to phase one, or phase one to phase two). However, for efficiency, it is preferable that only one increment or decrement signal be generated for the slip of an entire word (e.g eight clock cycles for an eight bit word) Moreover, it will be appreciated that while particular circuitry for the phase slip detector was provided, different circuits accomplishing the same functions could be utilized. Therefore, it will be apparent to those skilled in the art that other changes and modifications may be made to the invention as described without departing from the spirit and scope of the invention as so claimed.

We claim:

1. Apparatus for transferring a data payload (SPE) from a first substantially SONET signal having an accompanying clock signal of a first frequency into a second substantially SONET signal having an accompanying clock signal of different frequency, comprising:

(a) means for extracting a first data payload from said first substantially SONET signal, said first data payload comprised of a plurality of bytes, each byte having a plurality of bits, and for forwarding a first timing signal indicative of a byte phase of said first data payload bytes;

(b) a data storage means coupled to said means for extracting into which said bytes of said first data payload are loaded;

(c) data write means coupled to at least one of said means for extracting and said storage means for causing the bytes of said first data payload to be written from said means for extracting into said storage means;

(d) means for building said second substantially SONET signal coupled to said storage means, said second substantially SONET signal having a second data payload comprised of said first data payload bytes, said second data payload having its accompanying clock dictated by an external clock coupled to said means for building, said means for building including means for forwarding a second timing signal indicative of a byte phase of said second data payload bytes;

(e) data read means coupled to said external clock and to at least one of said storage means and said means for building, for causing the first data payload in the storage means to be read at at least one predetermined byte phase of said external clock from the storage means into the means for building, said first data payload thereby constituting said second data payload;

(f) means for measuring indications of the length of time between the occurrences of said first and second timing signals and for generating first signals in response thereto, said means for measuring coupled to said means for forwarding a first timing signal and said means for forwarding a second timing signal, said means for measuring also including means for tracking changes in said measured indications and for generating second signals in response thereto, wherein at least one of said data write means and said data read means is responsive to said first signals generated by said means for measuring and writes or reads said first data payload bytes into or out of said storage means accordingly, and said means for building is responsive to said second signals generated by said means for tracking changes.

2. An apparatus according to claim 1, wherein:
said indications of the length of time between occurrences are indications of a relative byte phase difference between said first and second substantially SONET signals.

3. An apparatus according to claim 2, wherein:
said means for measuring indications is a start/stop counter which counts a number of clock cycles of one of said accompanying clocks between the occurrences of said first and second timing signals.

4. An apparatus according to claim 3, wherein:
said start/stop counter counts the number of clock cycles of said clock accompanying said first substantially SONET signal between a time related to the first clock cycle after said second timing signal to a time related to the clock cycle of said first timing signal.

5. An apparatus according to claim 2, wherein:
said first signals generated in response to said relative byte phase difference between said first and second substantially SONET signals include
a write at a first desired byte phase signal when said relative byte phase difference is greater than or equal to a first desired value, and
a write at a second desired byte phase signal when said relative byte phase difference is less than said first desired value,
wherein said write at a first desired byte phase signal and said write at a second desired byte phase signal cause said data write means to cause payload data to be written into said storage means at different times than said data read means causes payload data to be read.

6. An apparatus according to claim 1, wherein
said means for tracking includes means for storing a previous said indication of the length of time between the occurrences of a previous set of said first and second timing signals, and means for generating said second signals when the stored previous indication of the length of time and a current indication of the length of time between the occurrences of a current set of said first and second timing signals differ in value.

7. An apparatus according to claim 6, wherein:
said means for generating said second signals generates said second signals only when said current and previous indications of the length of time differ, and one of said current and previous indications is at a predetermined value.

8. An apparatus according to claim 7, wherein:
said means for generating said second signals generates a second signal indicative of the need for the amount of data in said storage means to be decreased when said previous indication of the length of time is greater than said current indication of the length of time, and said means for generating said second signals generates a second signal indicative of the need for the amount of data in said storage means to be increased when said previous indication of the length of time is smaller than said current indication of the length of time.

9. An apparatus according to claim 7, wherein:
said means for generating said second signals comprises a plurality of logic gates having indications of said current and previous indications of the length of time as inputs.

10. An apparatus according to claim 8, wherein:
said indications of the length of time between occurrences are indications of a relative byte phase difference between said first and second substantially SONET signals, and
said means for measuring indications is a start/stop counter which counts a number of clock cycles of one of said accompanying clocks between said the occurrences of said first and second timing signals.

11. An apparatus according to claim 10, wherein:
said first signals generated in response to said relative byte phase difference between said first and second SONET signals include
a write at a first desired byte phase signal when said relative byte phase difference is greater than or equal to a first desired value, and
a write at a second desired byte phase signal when said relative byte phase difference is less than said first desired value,
wherein said write at a first desired byte phase signal and said write at a second desired byte phase signal cause said data write means to cause payload data to be written into said storage means at different times than said data read means causes payload data to be read.

12. An apparatus according to claim 1, wherein:
said means for building further comprises pointer generation means for generating pointers pointing to the location in said second substantially SONET signal of the data payload, and payload request means coupled to said data read means for causing said data read means to cause said data payload to be read from said data storage means.

13. An apparatus according to claim 8, wherein:
said means for building further comprises pointer generation means for generating pointers pointing to the location in said second substantially SONET signal of the data payload, and payload request means coupled to said data read means for causing said data read means to cause said data payload to be read from said data storage means,
said payload request means being responsive to said second signals, such that when a second signal indicative of the need for the amount of data in said storage means to be increased is received, said payload request means retards the SPE phase by one byte, and when a second signal indicative of the need for the amount of data in said storage means to be decreased is received, said payload request means advances the SPE phase by one byte.

14. A method for transferring a data payload (SPE) from an incoming first substantially SONET signal having an accompanying clock signal of a first frequency into an outgoing second substantially SONET signal having an accompanying clock signal of different frequency, comprising:
(a) receiving said first substantially SONET signal, and extracting a first data payload from said first substantially SONET signal, said first data payload comprised of a plurality of bytes, and forwarding said first data payload to a data storage means;

(b) generating a first timing signal indicative of the phase of the bytes of said first substantially SONET signal;

(c) obtaining said bytes of said first data payload from said storage means in accord with said accompanying clock of said second substantially SONET signal in order to build said second substantially SONET signal, said accompanying clock of said second substantially SONET signal dictated by an external clock;

(d) generating a second timing signal indicative of the phase of the bytes of said second substantially SONET signal;

(e) measuring an indication of the length of time between the occurrences of said first and second timing signals, said indication providing an indication of the byte phase difference between said first and second substantially SONET signals;

(f) changing one of the phase at which the bytes of said first data payload are forwarded to said data storage means and the phase at which the bytes in said storage means are obtained from said storage means when the indication of byte phase difference indicates that said bytes are being forwarded and obtained from said data storage means undesirably closely in time.

15. A method according to claim 14, wherein:
said step of measuring an indication of the length of time comprises starting a counter at the occurrence of one of said first and second timing signals, and stopping the counter at the occurrence of the other of said first and second timing signals.

16. A method according to claim 15, wherein:
said steps of forwarding said first data payload and changing the phase comprise forwarding said first data payload at a first desired phase when said indication of a phase difference is greater than or equal to a first desired value, and forwarding said first data payload at a second desired phase when said indication of a phase difference is less than said first desired value 17. A method according to claim 14, further comprising:
(g) tracking changes in said measured indications, generating second signals in response thereto, and building said second substantially SONET signal in accord with said second signals.

18. A method according to claim 17, wherein
said step of tracking comprises storing a previous said indication of the length of time between the occurrences of a previous set of said first and second timing signals, and generating said second signals when the stored previous indication of the length of time and a current indication of the length of time between the occurrences of a current set of said first and second timing signals differ in value.

19. A method according to claim 18, wherein
said step of generating said second signals comprises generating said second signals only when said current and previous indications of the length of time differ, and one of said current and previous indications is at a predetermined value.

20. A method according to claim 19, wherein
said step of generating said second signals comprises generating a second signal indicative of the need for the amount of data in said storage means to be decreased when said previous indication of the length of time is greater than said current indication of the length of time, and generating a second signal indicative of the need for the amount of data in said storage means to be increased when said previous indication of the length of time is smaller than said current indication of the length of time 21. A method according to claim 17, wherein:
said step of building said second substantially SONET signal in accord with said second signals comprises generating a pointer for pointing to the location in said second substantially SONET signal of the data payload, adjusting said pointer based on said second signals, and adjusting the location of bytes obtained in said obtaining step in said second substantially SONET signal in building said second substantially SONET signal.

22. A method according to claim 21, wherein:
said stop of adjusting the location of bytes comprises inserting stuff in the byte after the H3 byte of the second substantially SONET signal when said second signal is indicative of the need for the amount of data in said storage means to be increased, and inserting data in the H3 byte of the second substantially SONET signal when said second signal is indicative of the need for the amount of data in said storage means to be decreased.

23. A method according to claim 17, wherein:
said step of measuring an indication of the length of time comprises starting a counter at the occurrence of one of at the occurrence of the other of said first and second timing signals, and
said steps of forwarding said first data payload and changing the phase comprise forwarding said first data payload at a first desired phase when said indication of a phase difference is greater than or equal to a first desired value, and forwarding said first data payload at a second desired phase when said indication of a phase difference is less than said first desired value.

24. A method according to claim 20, wherein:
said step of measuring an indication of the length of time comprises starting a counter at the occurrence of one of said first and second timing signals, and stopping the counter at the occurrence of the other of said first and second timing signals, and
said steps of forwarding said first data payload and changing the phase comprise forwarding said first data payload at a first desired phase when said indication of a phase difference is greater than or equal to a first desired value, and forwarding said first data payload at a second desired phase when said indication of a phase difference is less than said first desired value.

25. A method according to claim 22, wherein:
said step of measuring an indication of the length of time comprises starting a counter at the occurrence of one of said first and second timing signals, and stopping the counter at the occurrence of the other of said first and second timing signals, and
said steps of forwarding said first data payload and changing the phase comprise forwarding said first data payload at a first desired phase when said indication of a phase difference is greater than or equal to a first desired value, and forwarding said first data payload at a second desired phase when said indication of a phase difference is less than said first desired value.

26. Apparatus for transferring a data payload (SPE) from a first substantially SONET signal having an accompanying first clock signal of a first frequency into a second substantially SONET signal having a second accompanying clock signal of different frequency, comprising:
(a) a storage means for storing SPE bytes;
(b) means for extracting the bytes of an SPE from the first substantially SONET signal and sending said bytes at at least one predetermined byte phase of the first clock signal to said storage means for storage, said means for extracting being coupled to said storage means;
(c) means for obtaining the SPE bytes from said storage means at at least one predetermined byte phase of the second clock signal including means for building said second substantially SONET signal, said means for obtaining being coupled to said storage means; and
(d) means for comparing the times at which said means for extracting sends said bytes to said storage means and said means for obtaining obtains said bytes from said storage means, said means for comparing being coupled to said means for extracting and said means for obtaining, and said means for comparing including first signalling means for signalling one of said means for extracting and said means for obtaining to change the byte phase at which it sends or obtains said bytes to or from said storage means when said bytes are sent and obtained from said storage means undesirably closely in time.

27. An apparatus according to claim 26, wherein:
said means for comparing further comprises second signalling means for signalling said means for building that one of said first and second substantially SONET signals has slipped relative to the other of said first and second substantially SONET signals, and said means for building includes means for generating a negative or positive stuff in response to a signal of said second signalling means.

28. An apparatus according to claim 27, wherein:
said means for comparing times is a start/stop counter providing a count.

29. An apparatus according to claim 28, wherein:
said first signalling means signals said means for extracting to send a byte of said SPE of said first substantially SONET signal at a first desired byte phase when said count is greater than or equal to a first desired value, and said first signalling means signals said means for extracting to send a byte of said SPE of said first substantially SONET signal at a second desired byte phase when said count is less than said first desired value,
wherein by sending said bytes of said SPE of said first substantially SONET signal at a first desired byte phase signal and at a second desired byte phase signal, said bytes of said first substantially SONET signal are sent to said storage means at different times than said means for obtaining obtains said bytes.

30. Apparatus for transferring a first data payload from a first data signal having an accompanying clock signal of a first frequency into a substantially SONET signal having an accompanying clock signal of different but similar frequency to said first data signal, said first data payload comprising a plurality of bytes, each byte having a plurality of bits, comprising:

(a) means for obtaining a first timing signal indicative of a byte phase of said first data payload bytes;
(b) a data storage means for receiving said bytes of said first data payload;
(c) data write means for causing the bytes of said first data payload to be written into said storage means;
(d) means for building said second substantially SONET signal coupled to said storage means, said second substantially SONET signal having a second data payload comprised of said first data payload bytes, said second data payload having its accompanying clock dictated by an external clock coupled to said means for building, said means for building including means for forwarding a second timing signal indicative of a byte phase of said second data payload bytes;
(e) data read means coupled to said external clock and to at least one of said storage means and said means for building, for causing the first data payload in the storage means to be read at at least one predetermined byte phase of said external clock from the storage means into the means for building, said first data payload thereby constituting said second data payload;
(f) means for measuring indications of the length of time between the occurrences of said first and second timing signals and for generating first signals in response thereto, said means for measuring coupled to said means for obtaining a first timing signal and said means for forwarding a second timing signal, said means for measuring also including means for tracking changes in said measured indications and for generating second signals in response thereto, wherein at least one of said data write means and said data read means is responsive to said first signals generated by said means for measuring and writes or reads said first data payload bytes into or out of said storage means accordingly, and said means for building is responsive to said second signals generated by said means for tracking changes.

31. An apparatus according to claim 30, wherein:
said indications of the length of time between occurrences are indications of a relative byte phase difference between said first and second substantially SONET signals.

32. An apparatus according to claim 31, wherein:
said means for measuring indications is a start/stop counter which counts a number of clock cycles of one of said accompanying clocks between the occurrences of said first and second timing signals.

33. An apparatus according to claim 32, wherein:
said start/stop counter counts the number of clock cycles of said clock accompanying said first substantially SONET signal between a time related to the first clock cycle after said second timing signal to a time related to the clock cycle of said first timing signal.

34. An apparatus according to claim 31, wherein:
said first signals generated in response to said relative byte phase difference between said first data signal and said substantially SONET signal include
a write at a first desired byte phase signal when said relative byte phase difference is greater than or equal to a first desired value, and
a write at a second desired byte phase signal when said relative byte phase difference is less than said first desired value, wherein said write at a first desired byte phase signal and said write at a second desired byte phase signal cause said data write means to cause payload data to be written into said storage means at different times than said data read means causes payload data to be read 35. An apparatus according to claim 30, wherein:
said means for tracking includes means for storing a previous said indication of the length of time between the occurrences of a previous set of said first and second timing signals, and means for generating said second signals when the stored previous indication of the length of time and a current indication of the length of time between the occurrences of a current set of said first and second timing signals differ in value.

36. An apparatus according to claim 35, wherein:
said means for generating said second signals generates said second signals only when said current and previous indications of the length of time differ, and one of said current and previous indications is at a predetermined value.

37. An apparatus according to claim 36, wherein:
said means for generating said second signals generates a second signal indicative of the need for the amount of data in said storage means to be decreased when said previous indication of the length of time is greater than said current indication of the length of time, and said means for generating said second signals generates a second signal indicative of the need for the amount of data in said storage means to be increased when said previous indication of the length of time is smaller than said current indication of the length of time.

38. An apparatus according to claim 36, wherein:
said means for generating said second signals comprises a plurality of logic gates having indications of said current and previous indications of the length of time as inputs.

39. An apparatus according to claim 37, wherein:
said indications of the length of time between occurrences are indications of a relative byte phase difference between said first data signal and said substantially SONET signal, and
said means for measuring indications is a start/stop counter which counts a number of clock cycles of one of said accompanying clocks between said the occurrences of said first and second timing signals.

40. An apparatus according to claim 39, wherein:
said first signals generated in response to said relative byte phase difference between said first data signal and said substantially SONET signals include
a write at a first desired byte phase signal when said relative byte phase difference is greater than or equal to a first desired value, and
a write at a second desired byte phase signal when said relative byte phase difference is less than said first desired value,
wherein said write at a first desired byte phase signal and said write at a second desired byte phase signal cause said data write means to cause payload data to be written into said storage means at different times than said data read means causes payload data to be read.

41. An apparatus according to claim 30, wherein:
said means for building further comprises pointer generation means for generating pointers pointing to the location in said substantially SONET signal of the data payload, and payload request means coupled to said data read means for causing said data read means to cause said data payload to be read from said data storage means.

42. An apparatus according to claim 37, wherein:
said means for building further comprises pointer generation means for generating pointers pointing to the location in said substantially SONET signal of the data payload, and payload request means coupled to said data read means for causing said data read means to cause said data payload to be read from said data storage means,
said payload request means being responsive to said second signals, such that when a second signal indicative of the need for the amount of data in said storage means to be increased is received, said payload request means retards the SPE phase by one byte, and when a second signal indicative of the need for the amount of data in said storage means to be decreased is received, said payload request means advances the SPE phase by one byte.

43. A method for transferring a data payload from a first data signal having an accompanying clock signal of a first frequency into an outgoing substantially SONET signal having an accompanying clock signal of different but similar frequency to said clock signal of said first data signal, comprising:
(a) forwarding said data payload of said first data signal to a data storage means;
(b) generating a first timing signal indicative of the phase of the bytes of said first data signal;
(c) obtaining said bytes of said data payload from said storage means in accord with said accompanying clock of said substantially SONET signal in order to build said substantially SONET signal, said accompanying clock of said substantially SONET signal dictated by an external clock;
(d) generating a second timing signal indicative of the phase of the bytes of said second substantially SONET signal;
(e) measuring an indication of the length of time between the occurrences of said first and second timing signals, said indication providing an indication of the byte phase difference between said first and second substantially SONET signals;
(f) changing one of the phase at which the bytes of said data payload are forwarded to said data storage means and the phase at which the bytes in said storage means are obtained from said storage means when the indication of byte phase difference indicates that said bytes are being forwarded and obtained from said data storage means undesirably closely in time; and
(g) tracking changes in said measured indications, generating second signals in response thereto, and building said substantially SONET signal in accord with said second signals.

44. A method according to claim 43, wherein:
said step of tracking comprises storing a previous said indication of the length of time between the occurrences of a previous set of said first and second timing signals, and generating said second signals when the stored previous indication of the length of time and a current indication of the length of time between the occurrences of a current set of said first and second timing signals differ in value and one of said current and previous indications is at a predetermined value.

45. A method according to claim 44, wherein:
said step of generating said second signals comprises generating a second signal indicative of the need for the amount of data in said storage means to be decreased when said previous indication of the length of time is greater than said current indication of the length of time, and generating a second signal indicative of the need for the amount of data in said storage means to be increased when said previous indication of the length of time is smaller than said current indication of the length of time.

46. A method according to claim 45, wherein:
said step of building said substantially SONET signal in accord with said second signals comprises generating a pointer for pointing to the location in said substantially SONET signal of the data payload, adjusting said pointer based on said second signals, and adjusting the location of bytes obtained in said obtaining step in said substantially SONET signal in building said second substantially SONET signal.

47. An apparatus according to claim 12 wherein:
said means for extracting determines which of said plurality of bytes of said first data payload is the first (J1) byte of said first data payload and generates an indication of the same,
said data write means further causes said indication of said first byte of said first data payload to be written to said data storage means along with said first byte of said first data payload,
said data read means reads said indication of said first byte of said first data payload together with said first byte of said first data payload to said means for building, and
said pointer generation means utilizes said indication of said first byte in generating pointers pointing to the location in said second substantially SONET signal of the data payload.

48. A method according to claim 21, further comprising:
determining which of said plurality of bytes of said first data payload is the first (J1) byte of said first data payload and generating an indication of the same, and forwarding said indication of said first byte of said first data payload to said data storage means along with said first byte of said first data payload,
obtaining said indication of said first byte of said first data payload together with said first byte of said first data payload and utilizing said indication in said step of generating a pointer.

49. An apparatus according to claim 41, wherein:
said means for obtaining obtains an indication of which of said plurality of bytes of said data payload is the first byte of said data payload,
said data write means writes said indication of said first byte of said data payload to said data storage means along with said first byte of said data payload,
said data read means reads said indication of said first byte of said data payload together with said first byte of said data payload to said means for building, and
said pointer generation means utilizes said indication of said first byte in generating pointers pointing to the location in said substantially SONET signal of the data payload.

* * * * *